F. A. WEGNER.
DUST COLLECTOR.
APPLICATION FILED MAR. 2, 1916.

1,245,540.

Patented Nov. 6, 1917.
2 SHEETS—SHEET 1.

Witness:
Jas. E. Hutchinson.
H. N. Ramsey

Inventor:
Frederick A. Wegner
By J. E. Hutchinson Jr.
Attorney.

F. A. WEGNER.
DUST COLLECTOR.
APPLICATION FILED MAR. 2, 1916.
1,245,540.
Patented Nov. 6, 1917.
2 SHEETS—SHEET 2.
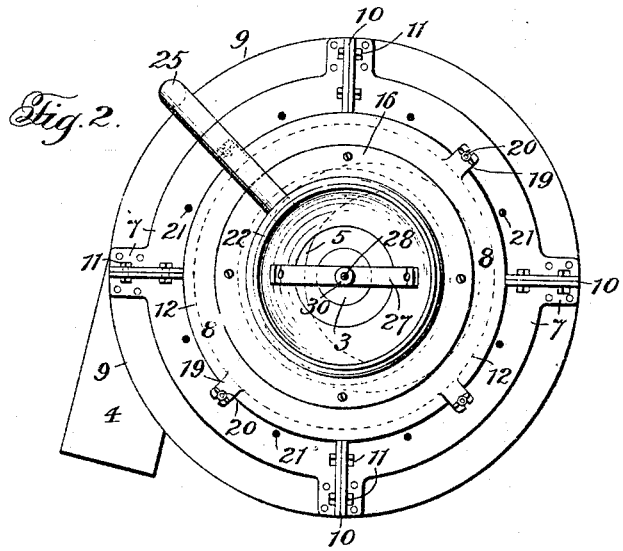
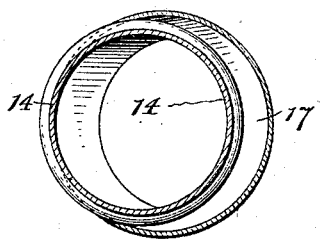
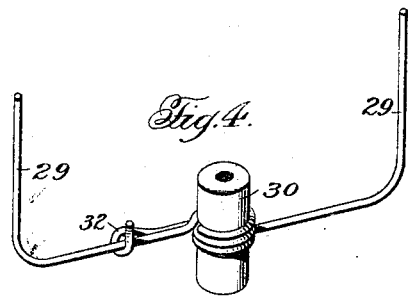
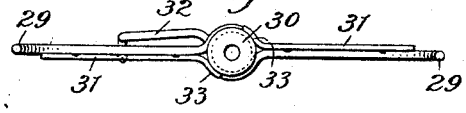

UNITED STATES PATENT OFFICE.

FREDERICK A. WEGNER, OF SILVER CREEK, NEW YORK.

DUST-COLLECTOR.

1,245,540.  Specification of Letters Patent.  Patented Nov. 6, 1917.

Application filed March 2, 1916. Serial No. 81,695.

*To all whom it may concern:*

Be it known that I, FREDERICK A. WEGNER, citizen of the United States, residing at Silver Creek, in the county of Chautauqua and State of New York, have invented certain new and useful Improvements in Dust-Collectors, of which the following is a specification, reference being had therein to the accompanying drawing.

This invention relates to dust collectors of the cyclone type, in which dust or other solid matter is separated from air by reason of the rapid whirling of the dust laden air in a substantially conical separating chamber.

The invention has for its primary object to provide a machine of the character specified, wherein the leakage of dust from the air outlet is materially reduced, or in fact, practically eliminated, and the machine generally improved in other respects so that the separating action is rendered effective.

It has been found by actual experiment that the axis of the whirl or vortical rotation of the air within the upper part of a dust collector of the type referred to, or, as may be more correctly stated, the axis of the inner stratum of air in said whirl which is freest of dust, is eccentric to the axis of said collector, and this due to the fact that the air after it has made its first complete circuit within the upper part of the collector will encounter the stream of incoming dust laden air and be forced to one side in a direction away from the tangential inlet passage to the collector. Such being the case, it is an important object of the invention to arrange the air discharge tube with its lower or inlet end eccentrically disposed relative to the axis of the collector, or in other words, to position said lower end off center and directly in line with the normal axis of the inner stratum of whirling air which is freest from dust.

A further object of the invention is the provision of a machine of the class described wherein the massing and delivering of the dust is properly effected. To this end the air discharge tube or tubular guard is positioned at an angle to the vertical, with its upper or outlet end arranged concentric with regard to the collector and with its lower or inlet end eccentrically disposed relative to the axis thereof, in which event sufficient space within the upper part of said collector at a point on the inlet side of the same will be provided to allow the dust particles and heavy dust laden air, which should and naturally do hug the outer wall of the collector, to be delivered at a point below the incoming stream of air. In such a case the said dust particles and heavy dust laden air do not encounter, to any great degree, the incoming stream of air and necessarily the dust particles are not forced out of their natural whirling path or to a position where they would be liable to be drawn out of the collector with the purified air.

Another object of the invention is the provision of means within the cylindrical portion of the dust collector to prevent the expanding of the air prior to its entering the conical portion of said collector, such means being associated with the tubular guard and arranged in such relation to the wall of said cylindrical portion as to be able to pinch or compress the air shortly after it has entered the collector, thereby increasing the velocity of the air and effectually forcing the dust particles into close proximity to the outer wall of the separating chamber, it being understood that the air is further pinched or compressed as the same is forced to continue its whirling action in the conical portion of the collector.

A still further object of the invention is the provision of means whereby the air discharge tube or tubular guard, with its lower end arranged off center, may be adjusted in a horizontal plane for the purpose of properly positioning said lower end, in accordance with varying conditions existing in connection with the installation of an apparatus such as is referred to herein. In this connection it is to be noted that the axis of the eccentric whirling body of air within the collector varies according to the velocity of the air blowing into the said collector.

Another object of the invention is the provision of means whereby the air pinching device may be adjusted in a horizontal plane, so that the best results may be obtained under conditions existing in any particular installation.

A further object of the invention is the provision of an air return tube which leads from the upper portion of the tubular guard and enters the collector at a point near the bottom thereof, discharging in a downward direction and serving to keep this part of the receptacle free from dust, and furthermore effectually preventing all updraft.

With these and other objects in view, the invention consists in the construction and novel combination of parts hereinafter more fully set forth and claimed, it being understood that various changes in the form, proportion, size and minor details of construction, within the scope of said claims, may be resorted to without departing from the spirit or sacrificing any of the advantages of the invention.

In the drawings:—

Fig. 2 is a top plan view of the same;

Fig. 3 is a detail sectional view of the lower portion of the tubular guard, said section being taken on line 2—2 of Fig. 1;

Fig. 4 is a perspective view of the agitator arm structure, and

Fig. 5 is a top plan view of the same.

Figure 1:
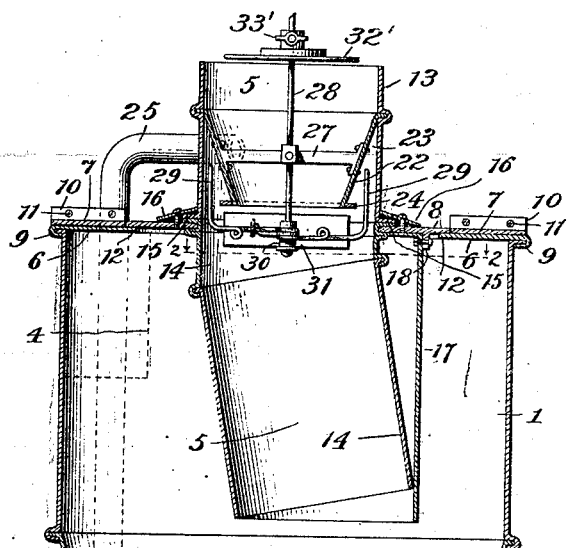
Figure 1 is a central vertical section of a dust collector embodying my invention.
Figure 1:
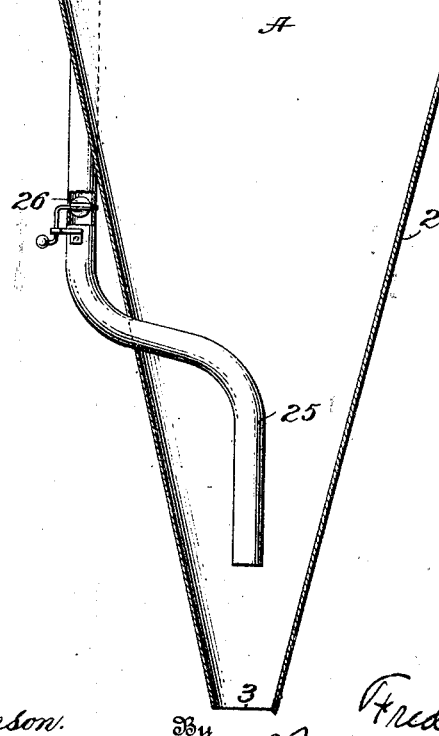

Referring to the drawings, A denotes the separating chamber, which comprises the usual upper cylindrical portion 1, and a lower tapered or conical portion 2, terminating at its lower end in a dust discharge opening 3. The upper cylindrical portion is provided with the usual tangential inlet passage 4, for the dust laden air, and 5 represents the usual tubular guard or exhaust tube forming an outlet through which the purified air escapes. In the present instance, however, the tubular guard is arranged for a part of its length, at an angle to the vertical with its upper or outlet end portion concentric to the separating chamber or casing and with its lower or inlet end eccentrically disposed relative to the axis of said chamber, such a structure being provided for a purpose to be hereinafter more fully described.

It may be noted in connection with the general structure of the dust collector herein shown, although the same forms no part of the present invention, that the conical portion 2 of the separating chamber is of comparatively great length and small in diameter, being shaped like a long slender frustum of a cone, and has a relatively small dust discharge opening located at the smaller end of the separating chamber. The wall of the separating chamber is preferably shaped like the surface of an inverted cone, the altitude of which is three times the diameter of its base, it being found that a separating chamber proportioned in this manner gives better results and attains better separation, in which event the air leaving the collector is much more free from fine dust than in separators having the conical part of the separating chamber of different proportions.

The top or deck of the collector is of special construction, comprising an outer sheet metal portion 6, a superposed sectional cast iron strengthening member 7, and an inner circular plate 8, arranged concentric with the collector and serving to support the tubular guard which projects downwardly within the casing or separating chamber. The outer portion 6 is secured in any suitable manner to the upper edge of the cylindrical part of the collector, but preferably by a seam joint, such as shown at 9 in Fig. 1 of the drawings, said outer portion having an opening therein concentrically disposed relative to the axis of the collector. The strengthening member 7 which is in the form of a flat sectional ring is made preferably in four parts, as shown, having upstanding flanges 10, which are bolted together as indicated at 11, and this member is riveted or otherwise secured to the outer sheet metal portion 6, the inner diameter of said sectional ring being slightly larger than the opening formed in said outer top portion, thus providing a supporting ledge upon which the circular plate 8 is adapted to rest, it being understood that said circular plate is of a diameter slightly less than the inner diameter of the sectional ring within which it fits. It is, therefore, to be noted that the circular plate 8 neatly fits within the sectional ring 7, and is arranged in the same horizontal plane therewith, being supported upon the annular ledge 12, formed by extending the inner edge of the outer top portion 6 a slight distance inward beyond the inner edge of the sectional ring.

As heretofore referred to at some length, it has been found that the vortex or center of the whirling body of air within a collector of the type herein shown is eccentric with regard to the axis of the casing, and to this end I provide for arranging the lower end of the tubular guard off center or in fact in line with the normal axis, or center of the inner stratum of whirling air within the collector. Said tubular guard in the present instance is preferably made in two main portions, an upper portion 13 extending without the casing, or receptacle, and a lower portion 14 depending from the circular plate 8 and projecting within the casing. The circular plate 8 is provided with a concentric circular opening, and within this opening is supported the tubular guard, the upper end of the lower portion of said guard being securely fastened to the circular plate by beading the same about the inner circular edge thereof, said lower portion being so constructed as to depend therefrom in a direction at an angle to the vertical, so that its lowermost end will be eccentrically disposed as above described. The upper portion of the tubular guard is of the same diameter as the lower portion and provided with an outwardly extending circular flange 15, at its lower end, serving as a means by which said upper portion 13 may be detachably and movably fixed in proper position relative to the lower portion of said guard. To this end I provide a clamping ring 16 which engages said circular flange and securely fastens the same to the upper end of the lower portion of the guard, said clamping ring being bolted to the circular plate as clearly shown in Figs. 1 and 2 of the drawing.

Provision is also made in the cylindrical portion of the separating chamber to prevent the expanding of the air prior to its entering the conical portion of said chamber, and in this connection an apron 17 is provided, the same being arranged parallel with the wall of the cylindrical portion of the collector, and of substantially the same length as the lower portion of the tubular guard. This apron is bolted, riveted or otherwise secured at its upper end to a depending flange 18 formed upon the underside of the circular plate, and its side edges are preferably soldered to opposite sides of the lower portion of the tubular guard. It will, therefore, be obvious that the apron as thus constructed forms, with the cylindrical wall of the collector, a restricted space for the passage of the whirling air, thus serving to pinch or compress the air shortly after it has entered the collector, whereby the velocity of the air is materially increased and better results obtained in separating all dust particles from the air.

Reference has been made to the fact that the circular plate 8, to which is secured the tubular guard and its apron 17, is mounted for rotatable adjustment upon the top of the collector, and this for the purpose of properly positioning the lower end of the tubular guard, and also bringing about an effective position for the air pinching apron 17, it being found from actual experiment that the eccentric axis of the whirling air, and the point at which the air should be compressed, varies according to the velocity of the air as it is blown into the collector. To properly retain the circular plate, and necessarily the tubular guard and its apron, in adjusted position, said plate is provided with outwardly extending lugs 19 carrying thumb screws 20 which are adapted to engage within any one of a series of screw holes 21, formed in the cast iron strengthening member.

The air escaping from the dust collector also whirls at a high velocity so that a certain amount of separation takes place in the air escape opening, or tubular guard, of the collector. In order to prevent such small quantities of dust, which may find their way into the tubular guard, from passing out with the purified air, I provide an inverted frusto-conical member 22, in the upper end of the tubular guard, which, with the walls of said guard, forms an auxiliary dust chamber 23, for catching any dust particles which may be thrown out against the walls of the tubular guard by the whirling action of the air therein. This member 22 is secured at its upper end within a bead formed in the upper portion of the tubular guard, and from thence extends downwardly and inwardly within said guard, and at its lower end is provided with an outwardly extending circular flange 24, as clearly shown in Fig. 1.

The dust collected in the auxiliary chamber 23 is conveyed therefrom through a tube 25 leading from the side of said chamber, and under ordinary circumstances would be discharged at any suitable or convenient point, usually a dust box outside the collector. It is the purpose of this invention, however, to carry this tube downwardly on the outside of the collector and have the same enter the collector through the side thereof at a point near its lower end, the lowermost end of the tube being centrally disposed within the collector and discharging in a downward direction and serving to keep the lower dust outlet part of the collector free from dust, and furthermore effectually preventing all updraft within the collector. In order to be able to regulate the force of the air passing through this air return tube 25, an adjustable valve 26 is provided in that portion of the tube which is located outside of the collector, in which event said valve is placed at a convenient point where it may be easily adjusted to suit existing circumstances.

Extending transversely across this frusto-conical member 22 is a supporting bar 27, said bar being bolted or otherwise secured thereto as shown. Rigidly secured to this supporting bar is a vertical rod 28, centrally arranged within the tubular guard, and forming a shaft upon which agitator arms 29—29 are journaled. These agitator arms extend horizontally in opposite directions from a hub 30 which is journaled on the lower end of the rod 28, at a point slightly below the lower edge of the frusto-conical member 22, and said agitator arms are then bent upwardly at their free ends at right angles to their horizontal portions, and extend into the auxiliary dust chamber. A blade 31 is also provided which is secured to the horizontal portions of the agitator arms in any preferred manner, and serves as a means against which the whirling air, as it passes through the tubular guard, may impinge, to cause the rotation of the agitators. In this manner dust is prevented from settling in the auxiliary chamber, which would otherwise be the case, and interfering with the successful operation of the collector.

A detailed structure of the agitator arms is illustrated in Figs. 4 and 5 of the drawings, each agitator arm being loosely connected to its hub 30 so as to be capable of being moved independently of the other arm, in which event the agitator structure may be folded upon itself to facilitate withdrawing the same from its normal position in the collector. In this connection it is to be noted that in order to withdraw the agitator structure from the collector, say for the purpose of repair, it is only necessary to remove the regulating disk or governor 32 from the vertical rod 28 and then disconnect the rod 28 from its supporting bar 27, in which event the agitator structure may be lowered within the tubular guard and folded upon itself to a position where it is detached from the supporting bar 27, whereupon this entire structure, namely, the agitator arms, blades, and the vertical rod 28, may be withdrawn from the tubular guard through the space between the walls of said guard and the supporting bar 27. The agitator arms are preferably made of wire rod, each arm being secured to said hub by bending the same around the hub within an annular groove formed therein. To hold the arms in their extended position or normal working position, a spring wire catch 32 is provided the same preferably formed as an extenison of one of the wire rods from which the agitator arms are made, and adapted to coöperate with the other agitator arm as clearly shown in the drawing. The blades 31 are secured to the agitator arms by soldering the same thereto or in any other preferred manner and are provided at their inner ends with extensions 33 which bear against the hub 30.

Instead of providing the particular means shown in the drawing for holding the circular plate 8 in its various positions of adjustment, such means being designated by reference characters 19, 20, and 21 any other preferred fastening devices may be used if desired.

Adjustably mounted at the upper end of the rod or shaft 28 is a regulating disk or governor 32', the same being centrally located with respect to the outlet end of the tubular guard and capable of being lowered within the guard to the desired position for obtaining the proper amount of "down pressure" in the separating chamber. This regulating disk or governor may be held in its various positions of adjustment by means of a thumb screw 33'.

I claim:—

1. In a dust collector, the combination of a separating chamber having a tangential inlet opening and discharge openings for air and dust located respectively at the top and bottom of said collector, and a tubular guard arranged in said air discharge opening and forming an outlet for the purified air, said tubular guard having its lower end opening downwardly and eccentrically disposed relative to the axis of the collector.

2. In a dust collector, the combination of a separating chamber, and a tubular guard forming an outlet for the purified air, said tubular guard arranged at an angle to the vertical and having its lower end opening downwardly and eccentrically disposed relative to the axis of the collector.

3. In a dust collector, the combination of a separating chamber, and a tubular guard forming an outlet for the purified air, said tubular guard having its upper end concentric with regard to the axis of the collector and its lower end opening downwardly and eccentrically disposed relative to said axis.

4. In a dust collector, the combination of a separating chamber, a tubular guard forming an outlet for the purified air, said tubular guard having its lower end eccentrically disposed relative to the axis of the collector, and means for adjusting said tubular guard whereby the position of said lower end may be varied.

5. In a dust collector, the combination of a separating chamber having an inlet opening and discharge openings for air and dust, a circular plate rotatably associated with the top of the collector, a tubular guard carried by said plate and having its lower end eccentrically disposed relative to the axis of the collector, and means for clamping said plate in any one of a number of positions whereby the position of the lower end of said tubular guard may be varied.

6. In a dust collector, the combination of a separating chamber having an inlet opening and discharge openings for air and dust, a tubular guard, a member secured within the guard and forming with the inner walls of said guard an annular dust chamber, and a tube leading from said dust chamber and through which the dust collected by said chamber may be discharged.

7. In a dust collector, the combination of a separating chamber having an inlet opening and discharge openings for air and dust, a tubular guard, a member secured within the guard and forming with the walls of said guard an annular dust chamber for collecting any dust entering said guard, and a tube leading from said dust chamber and discharging within the collector at a point near the lower end thereof.

8. In a dust collector, the combination of a separating chamber having an inlet opening and discharge openings for air and dust, a tubular guard, an auxiliary dust chamber within said guard for collecting any dust entering the guard, and a tube leading from said chamber and discharging within the collector at a point near the lower end thereof.

9. In a dust collector, the combination of a separating chamber having an inlet opening and discharge openings for air and dust, a tubular guard, an auxiliary dust chamber within said guard, and a tube leading from said chamber to a point without the collector and then entering the collector and discharging in a downward direction at a point near the dust discharge outlet.

10. In a dust collector, the combination of a separating chamber having an inlet opening and discharge openings for air and dust, a tubular guard, an auxiliary dust chamber within said guard, a tube leading from said chamber to a point without the collector and discharging in a downward direction at a point near the lower end thereof, and a regulating valve in said tube.

11. In a dust collector, the combination of a separating chamber having an inlet opening and discharge openings for air and dust, a tubular guard, a frusto-conical member secured within the guard, and forming with the inner walls of said guard an annular dust chamber, and an agitator moving within said chamber.

12. In a dust collector, the combination of a separating chamber having an inlet opening and discharge openings for air and dust, a tubular guard, a frusto-conical member secured within the guard and forming with the walls of said guard an annular dust chamber, and a revolving agitator having arms projecting into said dust chamber.

13. In a dust collector, the combination of a separating chamber having an inlet opening and discharge openings for air and dust, a tubular guard, a frusto-conical member secured within the guard and forming with the walls of said guard an annular dust chamber, a vertical shaft mounted within the tubular guard, and agitator arms journaled thereon and projecting into said dust chamber.

14. In a dust collector, the combination of a separating chamber having an inlet opening and discharge openings for air and dust, a tubular guard, a frusto-conical member secured within the guard and forming with the walls of said guard an annular dust chamber, a vertical shaft mounted within the tubular guard, agitator arms journaled thereon, and projecting into said dust chamber, and a blade carried by said arms, for the purpose specified.

15. In a dust collector, the combination of a separating chamber having an inlet opening and discharge openings for air and dust, a circular plate rotatably associated with the top of the collector, means for securing said plate in fixed adjusted position, a sectional guard carried by said plate, the lower section of which is rigidly secured within a concentric opening formed in the plate, and the upper section of which is supported upon said plate and adjustable axially relative thereto, and a clamping ring for securing said upper section in adjusted position.

16. In a dust collector, the combination of a separating chamber having a cylindrical portion and a tapering or conical portion depending therefrom, a tubular guard forming an outlet for the purified air, and an apron partially surrounding said guard and forming with a wall of the cylindrical portion of said collector a restricted passage for the whirling air, whereby the air is pinched or compressed prior to its making a complete circuit within the receptacle.

17. In a dust collector, the combination of a separating chamber having a cylindrical portion and a tapered or conical portion depending therefrom, a tubular guard forming an outlet for the purified air, an apron depending from the top of the collector and connected to said guard along opposite sides thereof and forming with a wall of the cylindrical portion of said collector a restricted passageway for the whirling air, whereby the air is pinched or compressed prior to its making a complete circuit within the receptacle, and means for adjusting said apron in a horizontal plane to any one of a series of positions within said collector.

18. In a dust collector, the combination of a separating chamber having a cylindrical portion and a tapered or conical portion depending therefrom, a tubular guard forming an outlet for the purified air, a circular plate rotatably associated with the top of the collector, a depending flange upon the underside of said circular plate, an apron secured to said flange and forming with the wall of the cylindrical portion of said collector a restricted passageway for the whirling air, and means for clamping said rotatable plate in any one of a series of adjusted positions, whereby said apron may be located in proper position for pinching or compressing the air prior to its making a complete circuit within the receptacle.

19. In a dust collector, the combination of a separating chamber having an inlet opening and discharge openings for air and dust, a sectional strengthening member resting upon the top of the collector, a circular plate also resting upon the top of the collector and rotatably associated therewith, said plate situated in the same horizontal plane with the sectional strengthening member and coöperating therewith in bringing about the proper adjustment for said plate in a horizontal plane, and a sectional tubular guard carried by said plate.

20. In a dust collector, the combination with a separating chamber having an inlet opening and discharge openings for air and dust, of a plate circularly adjustable upon the top or deck of said collector, and a tubular guard carried by said plate.

21. In a dust collector, the combination with a separating chamber and a deck or top therefor, of a plate circularly adjustable on said deck, a sectional tubular guard carried by said plate, and means whereby said plate and the lower section of said tubular guard may be circularly adjusted without disturbing the normal position of the upper section of said guard.

22. In a dust collector, the combination of a separating chamber having an inlet opening and discharge openings for air and dust, a dust chamber arranged within said collector, and a foldable agitator having arms projecting into said dust chamber.

23. In a dust collector, the combination of a separating chamber having an inlet opening and discharge openings for air and dust, a dust chamber arranged within said collector, and a revolving agitator having arms projecting into said dust chamber, said arms being so associated with the journal of said revolving agitator as to be capable of being moved to a position to facilitate the withdrawal of the agitator structure from the collector.

24. In a dust collector, the combination of a separating chamber having an inlet opening and discharge openings for air and dust, a dust chamber arranged within said collector, and an agitator structure comprising a hub, agitator arms loosely secured to said hub to permit said arms to move to a position where they may be withdrawn from the collector, and a spring catch for holding said arms in extended position.

25. In a dust collector, the combination of a separating chamber for an inlet opening and discharge openings for air and dust, a tubular guard, a frusto-conical member secured within the guard and forming with the walls of said guard an annular dust chamber, a vertical shaft mounted within the tubular guard, a hub journaled upon said shaft, agitator arms loosely secured to said hub and provided at their free ends with upwardly extending portions projecting into said dust chamber, said agitator arms being capable of being moved to a position to facilitate the withdrawal of the agitator structure from the tubular guard, and a spring catch associated with said arms and serving to hold the arms in extended position when in use.

In testimony whereof I affix my signature in presence of two witnesses.

FREDERICK A. WEGNER.

Witnesses:
A. EARLE HUTCHINSON,
H. N. RAMSEY.